United States Patent
Shim

(10) Patent No.: US 7,643,840 B2
(45) Date of Patent: Jan. 5, 2010

(54) SYSTEM AND METHOD FOR CHANGING A TALK GROUP OF A MOBILE COMMUNICATION TERMINAL

(75) Inventor: Jae-Sung Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 623 days.

(21) Appl. No.: 11/320,828

(22) Filed: Dec. 30, 2005

(65) Prior Publication Data

US 2006/0154682 A1  Jul. 13, 2006

(30) Foreign Application Priority Data

Jan. 8, 2005  (KR)  ..................... 10-2005-0001937

(51) Int. Cl.
*H04B 7/00* (2006.01)
*H04Q 7/20* (2006.01)

(52) U.S. Cl. .................... 455/519; 455/456.1; 455/517; 455/520

(58) Field of Classification Search ................. 455/519, 455/520, 456.1, 518, 456.5, 517, 416, 452.1, 455/415, 420, 446, 514
See application file for complete search history.

(56) References Cited

U.S. PATENT DOCUMENTS

| | | | |
|---|---|---|---|
| 5,471,646 A * | 11/1995 | Schultz | ........................ 455/519 |
| 5,613,209 A | 3/1997 | Peterson et al. | |
| 6,240,069 B1 | 5/2001 | Alperovich et al. | |
| 6,308,079 B1 * | 10/2001 | Pan et al. | ..................... 455/519 |
| 6,898,423 B2 | 5/2005 | Motegi et al. | |
| 2003/0186716 A1 * | 10/2003 | Dorenbosch et al. | ........ 455/519 |
| 2004/0198376 A1 | 10/2004 | Chandhok et al. | |
| 2004/0259581 A1 * | 12/2004 | Crisler et al. | ............... 455/519 |
| 2005/0186970 A1 * | 8/2005 | Yates et al. | .............. 455/456.5 |

FOREIGN PATENT DOCUMENTS

| | | |
|---|---|---|
| EP | 0700226 | 3/1996 |
| JP | 2001-346267 A | 12/2001 |
| KR | 10-2006-0020348 | 3/2006 |
| WO | 99/66757 | 12/1999 |
| WO | 03/086004 | 10/2003 |
| WO | 2004/012421 A1 | 2/2004 |
| WO | 2005/086521 | 9/2005 |

OTHER PUBLICATIONS

English language Abstract of Korea 10-2006-0020348.
English language Abstract of JP 2001-346267 A.

* cited by examiner

*Primary Examiner*—John Lee
(74) *Attorney, Agent, or Firm*—Birch, Stewart, Kolasch & Birch, LLP

(57) ABSTRACT

A system and method for changing a talk group of a mobile communication terminal, which includes a PTT (Push To Talk) server and a mobile communication terminal is described. The PTT server is configured to transmit a message requesting the mobile communication terminal to change a talk group based on a location of the mobile communication terminal. The mobile communication terminal is configured to transmit a message approving change of the talk group.

21 Claims, 4 Drawing Sheets

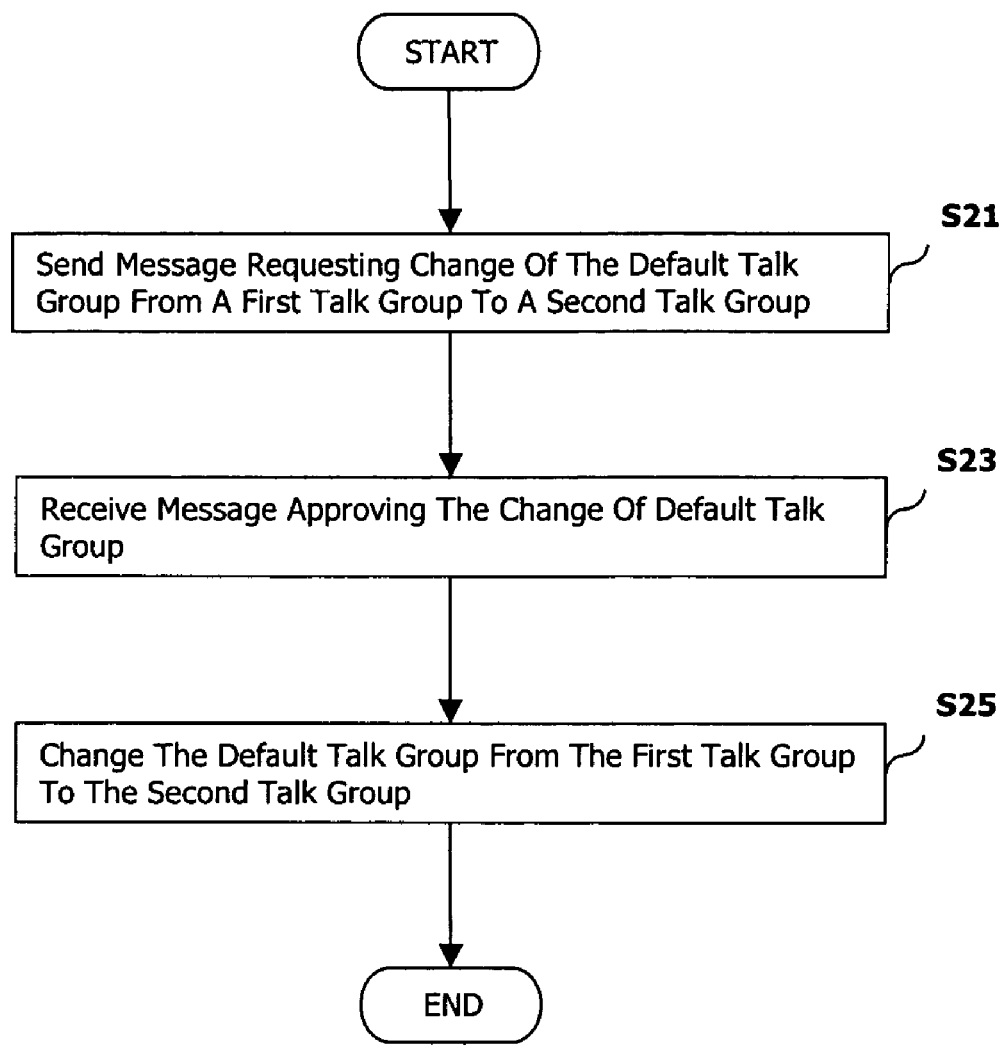

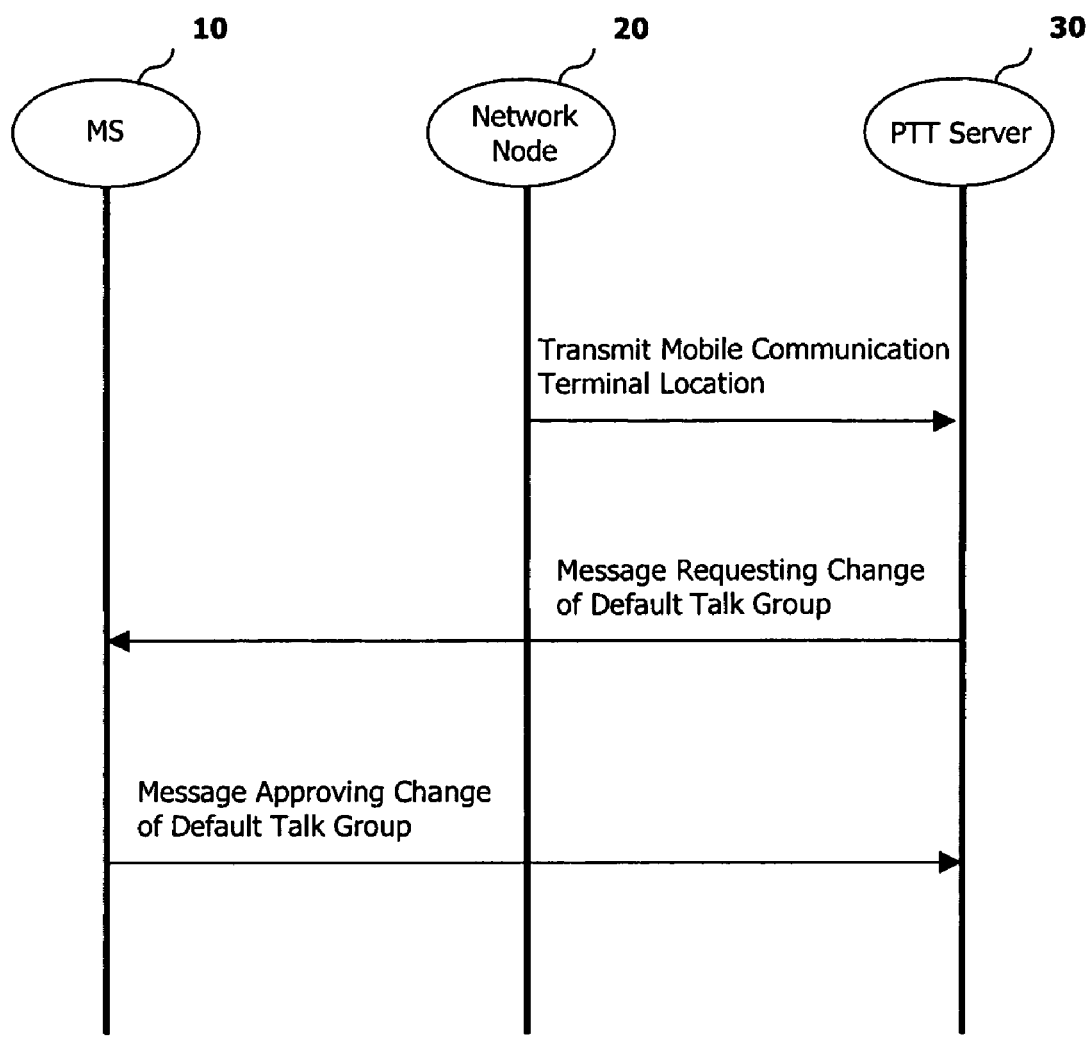

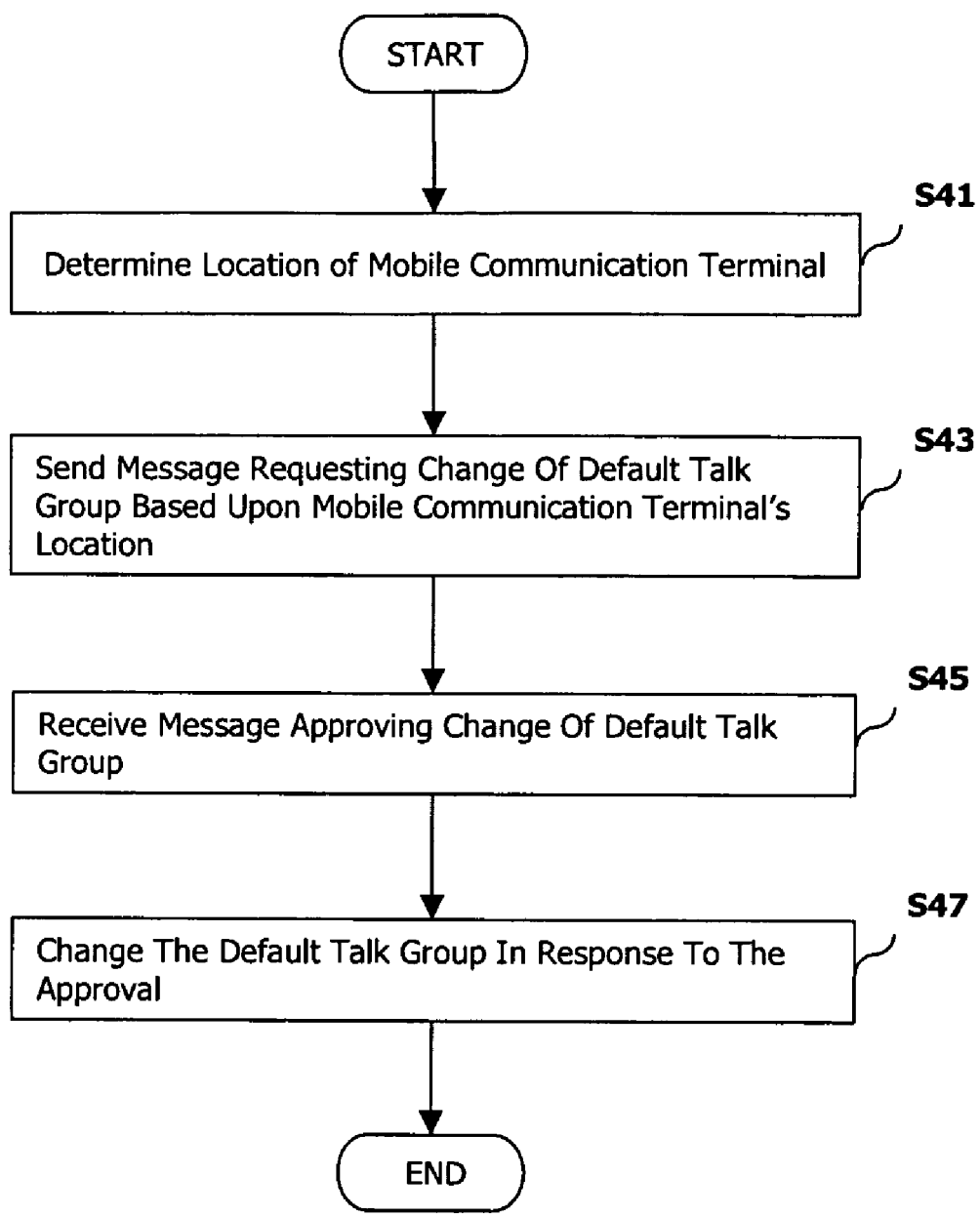

SYSTEM AND METHOD FOR CHANGING A TALK GROUP OF A MOBILE COMMUNICATION TERMINAL

This application claims the benefit of Korean Application No. 10-2005-01937, filed on Jan. 8, 2005, which is hereby incorporated by reference in its entirety.

BACKGROUND OF THE INVENTION

1. Field of the Invention

The present invention relates to a mobile communication terminal, and more particularly, to a system and method for changing a talk group of the mobile communication terminal, which improves the user convenience of a PTT service.

2. Description of the Related Art

Currently, many mobile communication terminals on the market function as more than just wireless communication devices. For example, some mobile communication terminals include advanced functions, such as a camera function or a multimedia function, in addition to a wireless communication function. These advanced functions have become more popular due to enhancement of display units of the mobile communication terminals and realization of high speed communication. Nowadays, it is nearly standard for a mobile communication terminal to include a high resolution camera and an LCD (Liquid Crystal Display) screen.

An additional function that has been developed for use in mobile communication terminals is PTT (Push To Talk). Like a walkie talkie service, a PTT service is a half-duplex, one-way communication method, by which only one call party can transmit at a time, providing a One-to-One or One-to-Many voice communication service.

Full-duplex communication allows simultaneous, two-way voice communication. In contrast, in half-duplex communication, such as in a PTT service, only one party can be designated as a speaker at a time, and every other party must be designated as listeners. An apparatus supporting a PTT service of a mobile communication terminal in accordance with the related art is described below with reference to FIG. 1.

FIG. 1 illustrates the operation of a related art system that supports a PTT service of a mobile communication terminal.

As shown in FIG. 1, the related art system supporting a PTT service of a mobile communication terminal includes: a mobile communication terminal 10 that sends a message requesting a change of a default talk group set by a user; a base station 20 that transmits the sent message; and a PTT server 30 that sends a message approving the change of the default talk group, in response to the message transmitted by the mobile communication terminal 10.

A related art method for supporting a PTT service of a mobile communication terminal is described below with reference to FIG. 2.

FIG. 2 is a flowchart illustrating a related art method for supporting a PTT service of a mobile communication terminal.

As shown in FIG. 2, the related art method for supporting a PTT service of a mobile communication terminal includes sending a message requesting that a default talk group be changed from a first talk group to a second talk group (S21); in response to the request, receiving a message approving change of the default talk group from the first talk group to the second talk group (S23); and, in response to approval, changing the default talk group from the first talk group to the second talk group (S25).

Initially, information identifying a plurality of talk groups is provided to and stored in the mobile communication terminal 10 and the PTT server 30, for example, by user input. Subsequently, a user selects one of the talk groups as a default talk group.

Thereafter, when the user desires to change the default talk group, the mobile communication terminal 10 sends a message requesting a default talk group change to the base station 20, and the base station 20 transmits the sent message to the PTT server 30 (S21).

The PTT server 30 sends a message approving change of the default talk group to the base station 20, in response to the request, and the base station 20 transmits the approval message to the mobile communication terminal 10 (S23).

Upon receiving the approval message, the default talk group is changed from a first talk group to a second talk group (S25).

However, a disadvantage of the above-noted related art system is that changing a default talk group from a first talk group to a second talk group requires a user to manually select the change of the default talk group.

SUMMARY OF THE INVENTION

Therefore, an object of the present invention is to provide a PTT service which is more convenient to a user than the related art systems, by providing a system and method for automatically changing a default talk group of a mobile communication terminal having a PTT function according to the location of the mobile communication terminal.

To achieve these and other advantages and in accordance with the purpose of the present invention, as embodied and broadly described herein, there is provided a system for changing a talk group of a mobile communication terminal, including a server; and a mobile communication terminal, where the server is configured to transmit a message requesting the mobile communication terminal to change a talk group based on a location of the mobile communication terminal, and the mobile communication terminal is configured to transmit a message approving change of the talk group.

The system may include a network node that determines the location of the mobile communication terminal and transmits the location to the server. The network node may include a base station and a base station controller. The location of the mobile communication terminal may be determined by a base station, and the mobile communication terminal may transmit its location to the base station.

The server may store information concerning a plurality of talk groups, and the information concerning the talk groups may include information that associates each talk group with a location and identifies a plurality of mobile communication terminals belonging to the talk group.

The mobile communication terminal may be configured to display a message indicating a request to change a talk group in response to receiving the message transmitted from the server, and the mobile communication terminal may transmit the message approving change of the talk group in response to a user approving the request to change a talk group. The talk group may be a talk group set as default. The server may be a PTT (Push To Talk) server.

To achieve these and other advantages and in accordance with the purpose of the present invention, as embodied and broadly described herein, there is provided a method for changing a talk group of a mobile communication terminal, including determining a location of the mobile communication terminal; and setting a talk group of the mobile communication terminal based upon its location.

Setting the talk group may include sending a message requesting the mobile communication terminal to change a talk group based on the location of the mobile communication terminal, receiving a message of approving change of the talk group as requested by the sent message, and changing the talk group in response to receiving the message approving the change. Changing the talk group may include changing the talk group in response to a user's selection, or automatically changing the talk group by the mobile communication terminal.

The mobile communication terminal may be associated with a plurality of talk groups, and each talk group may be associated with a location and include a plurality of mobile communication terminals. The talk group may be a talk group set as default.

Setting the talk group of the mobile communication terminal may include switching from a first talk group to a second talk group.

Another aspect of the present invention relates to a mobile communication terminal for providing a Push To Talk (PTT) service. The mobile communication terminal includes a memory that stores information for a plurality of talk groups, and is configured to change talk groups based on its location.

The mobile communication terminal may be configured to receive a message requesting a change of talk groups, and transmit a message approving a change of talk groups. The mobile communication terminal may receive the message requesting a change of talk groups based upon its location.

The mobile communication terminal may include a display unit that displays a message requesting a change of talk groups based upon the location of the mobile communication terminal, and may change talk groups in response to a user approving the request to change talk groups. The mobile communication terminal may be configured to transmit its location to a network node, which may include a base station and a base station controller.

Another aspect of the invention relates to a method for changing a talk group of a mobile communication terminal. The method includes receiving a message requesting a change of a talk group, based on a location of the mobile communication terminal, and transmitting, by the mobile communication terminal, a message approving a change of a talk group. The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a flowchart showing a related art method for supporting a PTT service of a mobile communication terminal;

FIG. 3 is a view showing the operations of a system for changing a talk group of a mobile communication terminal in accordance with the present invention; and FIG. 4 is a flowchart showing a method for changing a talk group of a mobile communication terminal in accordance with the present invention.

DETAILED DESCRIPTION OF THE PREFERRED EMBODIMENTS

Figure 1:
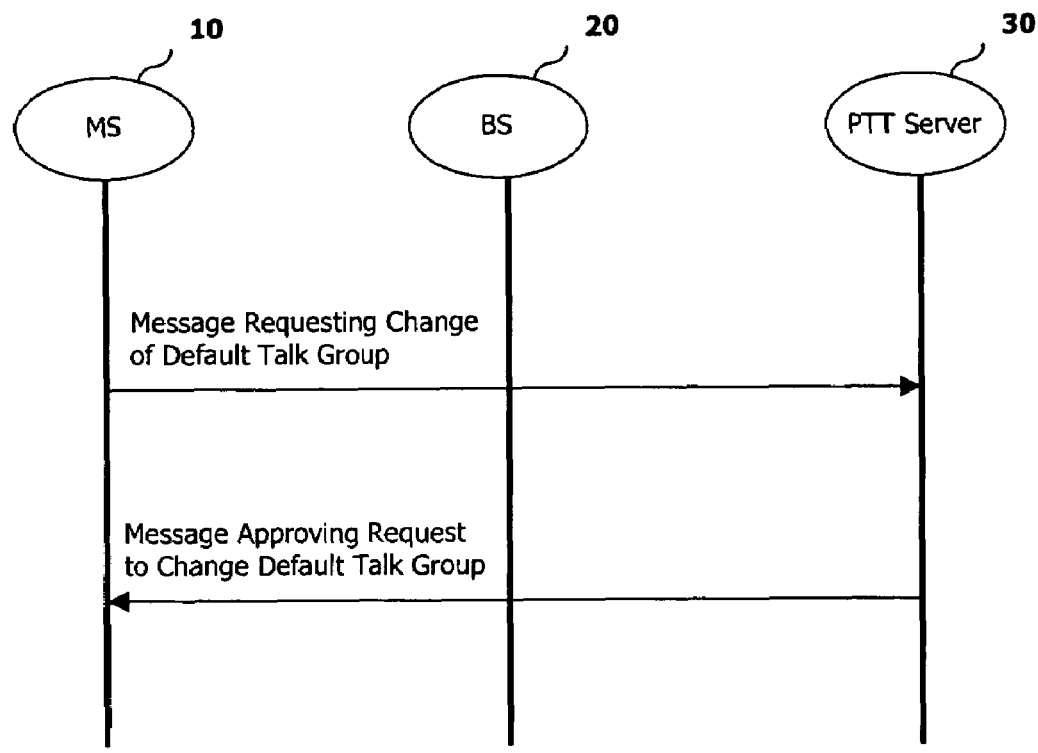
FIG. 1 is a view showing the operation of a related art system supporting a PTT service of a mobile communication terminal.

Reference will now be made in detail to the preferred embodiments of the present invention, examples of which are illustrated in the accompanying drawings.

Hereinafter, the preferred embodiments of a system and method for changing a talk group of a mobile communication terminal having a PTT function in accordance with the present invention will be described in detail with reference to the accompanying drawings.

FIG. 3 is a view illustrating operations of a system for changing a talk group of a mobile communication terminal in accordance with the present invention.

As shown in FIG. 3, the system for changing a talk group of a mobile communication terminal in accordance with the present invention includes: a network node 20 that determines and/or receives information regarding the location of the mobile communication terminal; a PTT server 30 that sends a message requesting that the default talk group of the mobile communication terminal be changed, based upon the location of the mobile communication terminal; and a mobile communication terminal 10 that transmits a message approving or denying change of the default talk group, in response to the request.

The present invention is not limited to any particular method of determining the location of the mobile communication terminal 10. For example, the location of the mobile communication terminal 10 may be determined by any suitable method, such as by triangulation or by use of a Global Positioning System (GPS). Further, the network node 20 may include any type of network device capable of receiving or determining the location of the mobile communication terminal 10, and may receive the location information directly or indirectly from the mobile communication terminal 10 itself. For example, the network node 20 may include or be integrated with a base station controller and/or base station, such as a base station that communicates the messages between the mobile communication terminal 10 and the PTT server 30.

The mobile communication terminal 10 may include any mobile device that has a PTT function, including, but not limited to a cellular telephone or a Personal Digital Assistant (PDA).

The PTT server 30 may include a server or any other suitable computing device capable of performing the talk group management functions disclosed in this specification, and is not limited to a server dedicated solely to a PTT service.

A method for changing a talk group of the mobile communication terminal in accordance with the present invention is described below with reference to FIG. 4.

FIG. 4 is a flowchart showing a method for changing a talk group of a mobile communication terminal in accordance with the present invention.

As shown in FIG. 4, the method for changing a talk group of a mobile communication terminal in accordance with the present invention includes: determining the location of the mobile communication terminal (S41); sending a message requesting that the default talk group of the mobile communication terminal be changed, based upon the mobile communication terminal's location (S43); receiving a message approving change of the default talk group, in response to the request (S45); and changing the default talk group, in response to the approval (S47).

The method for changing a talk group of the mobile communication terminal will be described in detail below.

Initially, information defining a plurality of talk groups is provided to and stored in a memory of the mobile communication terminal 10 and/or the PTT server 30. This information may be provided in any suitable manner, such as by a user inputting the information into the mobile communication terminal 10. Each talk group is defined by identifying the communication terminal or communication terminals which comprise the talk group. The communication terminals making up the talk groups may be any suitable types of terminals, such as mobile communication terminals, or wireline communication terminals, such as those having a paging function. Each communication terminal is identified by a unique identifier, such as, but not limited to, a telephone number.

Subsequent to, or concurrently with, storing the information defining the talk groups, a user associates each of the talk groups with a location. By associating each of the talk groups with a location, each talk group is designated as a default talk group for the mobile communication terminal 10 when located in the associated location. Further, a user may designate one of the talk groups as the default talk group for all locations other than those associated with a talk group.

Table 1 illustrates an example of the talk group information stored in the mobile communication terminal 10 and PTT server 30.

TABLE 1

| Talk group | Communication terminal | Location |
|---|---|---|
| First talk group | CT 1, CT 2 | A |
| Second talk group | CT 3, CT 4, CT 5 | B |
| Third talk group | CT 6, CT 7 | C |

As shown in Table 1, a plurality of talk groups can be divided into a first talk group, second talk group and third talk group according to location information. As an example, when the first talk group is set as the default among the plurality of registered talk groups, the mobile communication terminal 10 can communicate with the communication terminals included in the first talk group, that is with, CT 1 and CT 2, using a PTT service. Although not shown in the example of Table 1, it is noted that a particular communication terminal could be included in more than one talk group.

The network node 20 periodically determines the location of the mobile communication terminal 10 and provides the location to the PTT server 30 (S41). When the PTT server 30 determines that the mobile communication terminal 10 has moved into one of the specified locations (for example, from location A to location B, or from an unspecified location to location B), the PTT server transmits a message to the mobile communication terminal 10 requesting that the default talk group of the mobile communication terminal 10 be changed to the talk group associated with the current location of the mobile communication terminal 10 (in this example, to the second talk group, including communication terminals CT3, CT4 and CT5) (S43).

In response to the request, the mobile communication terminal 10 may automatically approve change of the talk group, or may approve change of the talk group only after displaying the request on a display unit of the mobile communication terminal 10 and receiving approval from the user (indicated by the user's input). However, the user may not wish to change the talk group, in which case, a denial message may be transmitted to the PTT server 30. If the user approves change of the talk group, or if the approval is automatic, the mobile communication terminal 10 transmits an approval message, which is received by the PTT server 30 (S45).

Upon receiving an approval message, the PTT server 30 changes the default talk group to the talk group associated with the mobile communication terminal's current location (the second talk group, in the above example), and provides the PTT service to the communication terminals included in the new default talk group (i.e., CT3, CT4 and CT5) (S47).

Accordingly, by associating talk groups with locations, the default talk group of the mobile communication terminal 10 can be automatically changed based upon a change in its location.

As described above, the system and method of the present invention for changing a talk group of a mobile communication terminal provides a PTT service which is more convenient to the user than related art systems.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A system for changing a default talk group of a mobile communication terminal, the system comprising:
    a server; and
    a mobile communication terminal,
    wherein at least one of the server and the mobile communication terminal includes a memory configured to store talk group information including at least first and second predefined talk groups, mobile communication terminals included in the first and second talk groups, and geographical locations corresponding to each of the first and second talk groups,
    wherein the server is configured to receive a current location of the mobile communication terminal, transmit a message requesting the mobile communication terminal to change a default talk group of the mobile communication terminal from the first talk group to the second talk group when the server determines the location of the mobile communication terminal is in a geographical location corresponding to the second talk group and being defined in the stored talk group information, and
    wherein the mobile communication terminal is further configured to transmit a message to the server either approving or disapproving of a change to the default talk group.

2. The system according to claim 1, further comprising:
    a network node configured to receive the location of the mobile communication terminal and to transmit the location of the mobile communication terminal to the server.

3. The system according to claim 2, wherein the network node comprises a base station and a base station controller.

4. The system according to claim 2, wherein the location of the mobile communication terminal is determined by a base station and transmitted to the network node.

5. The system according to claim 4, wherein the mobile communication terminal is further configured to transmit its location to the base station.

6. The system according to claim 1, wherein the mobile communication terminal is further configured to display a message indicating a request to change the default talk group in response to receiving the message transmitted from the server.

7. The system according to claim 1, wherein the mobile communication terminal is further configured to transmit the message approving or disapproving the change to the default talk group in response to a user input.

8. The system according to claim 1, wherein the server comprises a PTT (Push To Talk) server.

9. A method for changing a default talk group of a mobile communication terminal, the method comprising:

storing, in at least one of a memory of a server and a memory of the mobile communication terminal, talk group information including at least first and second predefined talk groups, mobile communication terminals included in the first and second talk groups, and geographical locations corresponding to each of the first and second talk groups, receiving, by the server, a current location of the mobile communication terminal;

transmitting, by the server, a message to the mobile communication terminal requesting the mobile communication terminal to change a default talk group of the mobile communication terminal from the first talk group to the second talk group when the server determines the location of the mobile communication terminal is in a geographical location corresponding to the second talk group and being defined in the stored talk group information; and transmitting, by the mobile communication terminal, a message to the server either approving or disapproving of a change to the default talk group.

10. The method according to claim 9, further comprising:

receiving, by a network node, the location of the mobile communication terminal; and transmitting, by the network node, the location of the mobile communication terminal to the server.

11. The method according to claim 10, wherein the network node comprises a base station and a base station controller.

12. The method according to claim 10, wherein the location of the mobile communication terminal is determined by a base station and transmitted to the network node.

13. The method according to claim 12, wherein the mobile communication terminal transmits its location to the base station.

14. The method according to claim 9, further comprising:

displaying on a display of the mobile terminal, a message indicating a request to change the default talk group in response to receiving the message transmitted from the server.

15. The method according to claim 9, wherein the mobile communication terminal transmits the message approving or disapproving the change to the default talk group in response to a user input.

16. The method according to claim 9, wherein the server comprises a PTT (Push To Talk) server.

17. A mobile communication terminal, comprising:

a memory configured to store talk group information including at least first and second predefined talk groups, mobile communication terminals included in the first and second talk groups, and geographical locations corresponding to each of the first and second talk groups; and a transceiver configured to transmit location information to a server about a current location of the mobile communication terminal, to receive from the server a message requesting the mobile communication terminal to change a default talk group of the mobile communication terminal from the first talk group to the second talk group when the server determines the location of the mobile communication terminal is in a geographical location corresponding to the second talk group and being defined in the stored talk group information, and to transmit a message to the server either approving or disapproving of a change to the default talk group.

18. The mobile communication terminal according to claim 17, wherein the transceiver is further configured to first transmit the location information of the mobile communication terminal to a base station, and the base station then transmits the location information to the server.

19. The mobile communication terminal according to claim 17, further comprising:

a display configured to display a message indicating a request to change the default talk group in response to receiving the message transmitted from the server.

20. The mobile communication terminal according to claim 17, further comprising:

an input unit configured to input the message approving or disapproving the change to the default talk group.

21. The mobile communication terminal according to claim 17, wherein the server comprises a PTT (Push To Talk) server.

* * * * *